United States Patent [19]

Morey

[11] Patent Number: 4,996,419

[45] Date of Patent: Feb. 26, 1991

[54] DISTRIBUTED MULTIPLEXED OPTICAL FIBER BRAGG GRATING SENSOR ARRANGEEMENT

[75] Inventor: William W. Morey, West Hartford, Conn.

[73] Assignee: United Technologies Corporation, Hartford, Conn.

[21] Appl. No.: 456,441

[22] Filed: Dec. 26, 1989

[51] Int. Cl.$^5$ .............................................. H01J 5/16
[52] U.S. Cl. .......................... 250/227.18; 250/231.10; 356/32
[58] Field of Search ...................... 250/227.23, 227.14, 250/227.18, 231.10; 73/800; 356/32

[56] References Cited

U.S. PATENT DOCUMENTS

| | | | |
|---|---|---|---|
| 3,458,257 | 7/1969 | Pryor | 356/32 |
| 4,577,100 | 3/1986 | Meltz et al. | 250/227.18 |
| 4,653,906 | 3/1987 | Dunphy et al. | 250/227.18 |
| 4,692,610 | 9/1987 | Szuchy | 356/32 |
| 4,717,253 | 1/1988 | Pratt, Jr. | 356/32 |
| 4,761,073 | 8/1988 | Meltz et al. | 356/32 |
| 4,763,009 | 8/1988 | Février et al. | 250/227.18 |
| 4,806,012 | 2/1989 | Meltz et al. | 356/32 |

Primary Examiner—David C. Nelms
Assistant Examiner—Stephone B. Allen
Attorney, Agent, or Firm—Peter R. Ruzek

[57] ABSTRACT

An arrangement for determining the magnitudes of selected physical quantities at a multitude of spaced locations includes an elongated optical fiber having a multitude of separate longitudinally spaced Bragg sensing gratings of substantially identical initial periodicity situated at such locations. Light pulses are launched into the core for propagation longitudinally thereof and for return from any of the sensing gratings of a detectable light echo at a central wavelength determined by the instantaneous value of the periodicity of the respective sensing grating that depends on the longitudinal stress applied to such grating as a result of the action of the physical quantity being monitored at the location of such grating. The light echoes are detected and allocated to the respective sensing gratings on the basis of time intervals elapsed between the issuance of the respective light pulses and the arrival of the echoes responsive thereto, and to the respective longitudinal stresses applied to the respective sensing gratings on the basis of the respective wavelengths of the echoes returned from the respective gratings.

13 Claims, 1 Drawing Sheet

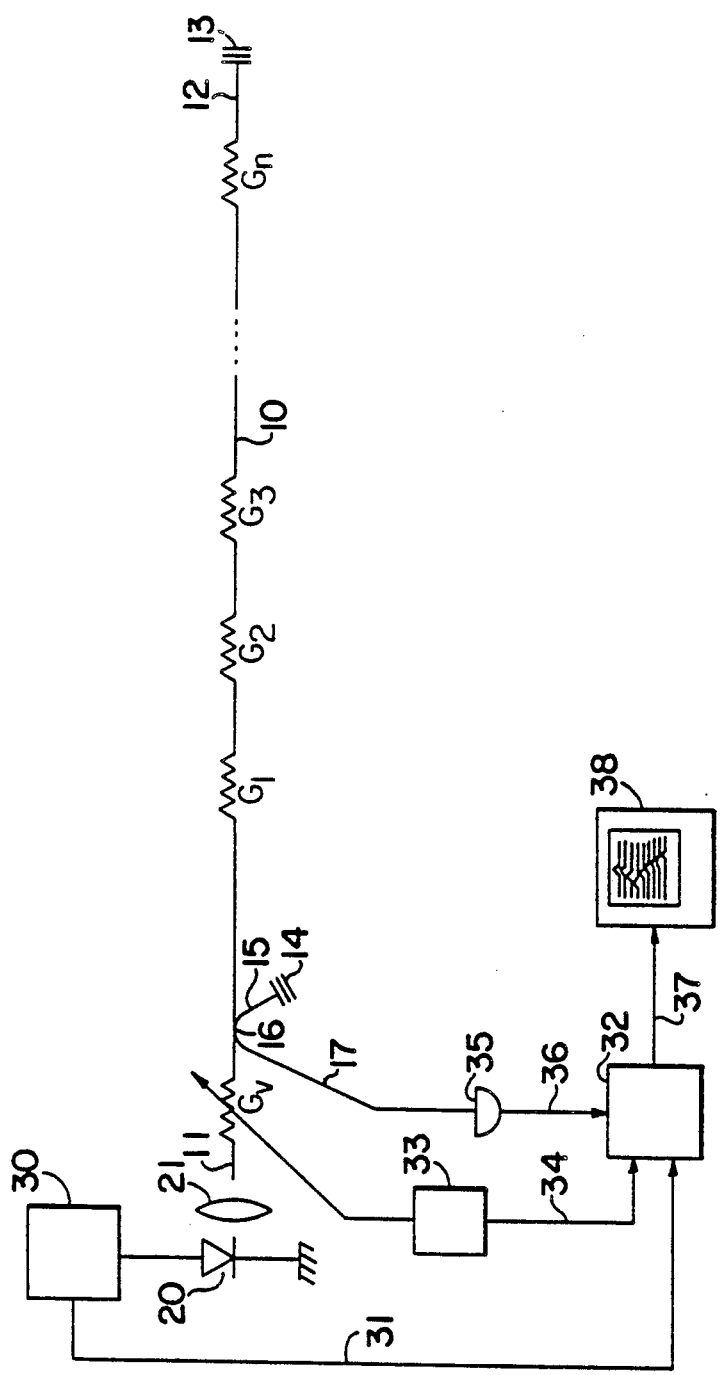

DISTRIBUTED MULTIPLEXED OPTICAL FIBER BRAGG GRATING SENSOR ARRANGEEMENT

TECHNICAL FIELD

The present invention relates generally to sensing of selected physical quantities, and more particularly to a sensing arrangement capable of simultaneously detecting such quantities, such as structural stresses, at a multitude of locations.

BACKGROUND ART

There are already known various constructions of sensing arrangements, among them such capable of sensing stresses within a structure. So, for instance, it is known from the commonly owned U.S. Pat. No. 4,806,012, issued on Feb. 21, 1989 and entitled "Distributed, Spatially Resolving Optical Fiber Strain Gauge", to embed in the structure the stresses of which are to be determined an optical fiber containing a plurality of periodic Bragg gratings of different original periodicities and thus each reflecting light in a narrow range around a central wavelength that is determined by the respective periodicity. These gratings are disposed at different regions of the structure so as to be subjected to different stresses, temperatures and strains depending on their locations in the structure, with attendant strain-related changes in their periodicities and hence in their central wavelengths of reflection. During the use of this known sensing arrangement, light is launched into the optical fiber in a such a wavelength range as to embrace the wavelengths of interest with respect to all of the Bragg gratings under all conditions. Then, either the light returned back to the launching end of the fiber is examined for the presence, or that reaching the other end for the absence or diminished intensity, of light around the respective central wavelengths of the gratings as altered by the stresses existing at the respective locations of the structure, thereby to determine the magnitude of such stresses.

The individual Bragg gratings are provided in the optical fiber core, prior to its installation in the structure, by exposing the optical fiber core through the cladding to an interference pattern of two ultraviolet light beams the light frequency and/or orientation of which relative to the optical fiber longitudinal axis is such, for each of the gratings, that the interference pattern maxima and minima extend through the fiber in directions normal to the longitudinal axis and that the periodicity (e.g. the distance between two consecutive maxima) is that desired for the particular grating.

As advantageous as this approach is for use in many applications in which the number of locations along the optical fiber to be monitored for stresses in the structure is relatively small, it has an important drawback in that each of the gratings has to have assigned to it a considerable amount of the available spectrum (i.e. not only its relatively narrow wavelength or frequency band but also the separation from the adjacent wavelength or frequency band assigned to another grating by an amount sufficient to avoid overlapping of or crosstalk between the adjacent channels under all circumstances, that is, even when the central wavelengths of the adjacent channels have moved, as a result of the stresses applied at the locations of the associated gratings, toward one another to the maximum extent), thus severely limiting the number of grating sensors that can be employed within each sensing optical fiber. For example, if a solid state device, such as an edge emitting diode or a laser diode were used as the light source, which would be highly desirable because of the relatively low cost and reliability of such device, it would only cover a wavelength range of 20 to 30 nm. On the other hand, each of the optical strain sensors of the above type would require up to 5 nm of bandwidth to cover 10,000 microstrain, so that only 4 to 6 sensors could be associated with each diode source.

Accordingly, it is a general object of the present invention to avoid the disadvantages of the prior art.

More particularly, it is an object of the present invention to provide a distributed optical fiber Bragg grating sensor arrangement which does not possess the disadvantages of the known arrangements of this kind.

Still another object of the present invention is so to develop the distributed sensor arrangement of the type here under consideration as to significantly increase the number of locations stresses from which data indicative of the quantity being monitored can be reliably collected using a single optical fiber containing a multitude of embedded Bragg gratings.

It is yet another object of the present invention to devise an arrangement of the above type which renders it possible to utilize a relatively inexpensive laser with limited bandwidth as a light source for launching light into the optical fiber for examination of the various Bragg gratings.

A concomitant object of the present invention is to design the sensing arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for determining the magnitudes of selected physical quantities at a multitude of spaced locations. This arrangement includes an elongated optical fiber having a waveguiding core and including a multitude of separate longitudinally spaced Bragg sensing gratings of substantially identical initial periodicity for all of the sensing gratings, each of the sensing gratings being situated at a different one of the locations. Longitudinal stresses are applied to the optical fiber in such a manner that their magnitude at each of the locations is dependent on the extent of deviation of the magnitude of the respective physical quantity being monitored at that particular location from its initial value, with attendant change in the periodicity. The arrangement of the present invention further includes means for launching light pulses into the core for propagation longitudinally thereof and for return from any of the sensing gratings of a detectable light echo at a central wavelength determined by instantaneous value of the periodicity of the respective sensing grating when the wavelength of the light reaching the respective sensing grating at least momentarily coincides with the central wavelength thereof, and means for so controlling the wavelength at which the launching means issues light as to coincide, at different times of a detection cycle, with at least all of the central wavelengths at which the sensing gratings return the echoes within the range of longitudinal stresses expected to be applied to the gratings by the applying means. Conducting means conducts the light echoes to a detecting location spaced from the optical fiber, and detecting means detects the light echoes as they arrive at the detecting location and issues a series of detection signals in response thereto. Last but not least, the arrangement of the present invention includes means for allocating the detection signals to the respective sensing gratings on the basis of time intervals elapsed between the issuance of the respective light pulses and the arrival of the echoes responsive thereto at the detecting means, and to the respective longitudinal stresses applied by the applying means to the respective sensing gratings on the basis of the respective wavelengths of the light pulses in response to which the respective gratings return the echoes. The arrangement of this type is especially suited for detecting structural stresses encountered at spaced locations of a structure, in which case the optical fiber is embedded in or otherwise attached to the structure to be monitored so that the longitudinal stresses applied to the respective sensing gratings result from the transmission of the structural stresses existing at the respective locations of the structure to the optical fiber portions situated at such locations and including the sensing gratings.

BRIEF DESCRIPTION OF THE DRAWING

The present invention will be described in more detail below with reference to the accompanying sole FIGURE of the drawing which is a somewhat simplified illustration of the sensing arrangement of the present invention, partially in an elevational view and partially in a block diagram form.

BEST MODE FOR CARRYING OUT THE INVENTION

Referring now to the sole FIGURE of the drawing in detail, it may be seen that the reference numeral 10 has been used therein to identify an optical fiber having a multitude of Bragg gratings $G_1$ to $G_n$ (wherein n denotes a large number, such as up to several hundred) provided therein. It is particularly advantageous when all of the gratings $G_1$ to $G_n$ are inscribed in the core of the optical fiber 10 by using the method disclosed in the aforementioned U.S. Pat. No. 4,806,012 the entire contents of which is incorporated herein by reference, so that they are spaced from one another in the longitudinal direction of the fiber 10 and are constituted by periodic variations in the refractive index of the optical fiber core the cumulative effect of which is the reflection of a meaningful proportion of light at a wavelength determined by the grating periodicity. However, unlike in the arrangement of the above patent, all of the gratings $G_1$ to $G_n$ have substantially the same original periodicity and, therefore, when light is caused to propagate longitudinally in the core of the optical fiber 10, each of them acts as a partial reflector for light in a very narrow band around substantially the same central wavelength, provided that the gratings $G_1$ to $G_n$ are not subjected to any, or at least are all subjected to the same, stresses. It should be appreciated, however, that the initial periodicities of the gratings $G_1$ to $G_n$ do not have to be exactly the same; as a matter of fact, it may be of advantage to stagger the initial periodicities, and thus the central wavelengths, of the gratings $G_1$ to $G_n$ slightly so as to avoid the potentially detrimental possibility that all of the gratings $G_1$ to $G_n$ would reflect light of the same central wavelength, such as under no-stress or equal-stress conditions.

The arrangement of the present invention will be described below as used for detecting structural stresses in a structure; under these circumstances, the optical fiber 10, the latter is embedded in, or otherwise attached at portions thereof that are situated between each two consecutive ones of the gratings $G_1$ to $G_n$ to, the structure the stresses in which are to be determined, in any manner that is well known to those familiar with embedding or attachment of optical fiber sensors in or to structures and which has been omitted from the drawing in order not to unduly encumber the same. Furthermore, it will be assumed in the following that the gratings $G_1$ to $G_n$ are of the type disclosed in the aforementioned patent; yet, Bragg gratings of other types could be used instead in the arrangement of the present invention.

The optical fiber 10 has a launching end portion 11 and another end portion 12 remote from the launching end portion 11. As illustrated, another Bragg grating $G_v$ is embedded in the optical fiber 10 at the launching end portion 11. This grating $G_v$ has the same original periodicity as the gratings $G_1$ to $G_n$ but, unlike them, it is of the selectively variable type, that is, its periodicity can be selectively changed by subjecting it to externally imposed stresses, for instance, in the manner disclosed in a commonly owned U.S. patent application Ser. No. 07/456,449 the disclosure of which is incorporated herein to the extent needed for understanding how such external stresses can be imposed on the grating $G_v$.

As more fully explained in the aforementioned U.S. Pat. No. 4,806,012, the gratings of this type (i.e. the gratings $G_1$ to $G_n$ as well as the variable grating $G_v$ used in the arrangement of the present invention as disclosed) individually act as narrow band rejection filters, reflecting a predetermined percentage of an optical signal traveling longitudinally through the core of the optical fiber 10 back to the point of origin or launching, thus forming a narrow notch in the grating transmittance spectrum and a commensurate peak in the grating reflectance spectrum at axial wavelength within a very narrow range around a central wavelength dictated by the grating periodicity, and hence its resonant wavelength. Now, it will be appreciated that, as any of the gratings $G_1$ to $G_n$ and $G_v$ is subjected to stresses resulting in longitudinal strains, its periodicity, and hence its central wavelength, varies commensurately.

The arrangement of the present invention utilizes this phenomenon for the determination of the stresses applied to the gratings $G_1$ to $G_n$ at their respective locations within or at the structure as a result of the stresses encountered in the structure at such locations at any given instant of time, and for controlling the reflection wavelength of the variable grating $G_v$. More particularly, a light source 20, illustrated as a laser diode, is positioned to emit light toward the launching or upstream end portion 11 of the fiber 10, and a collecting lens 21 is shown to be interposed between the light source 20 and the end face of the end portion 11 and serves to concentrate the light emitted by the source 20 into the core of the optical fiber 10 where it first encounters the variable grating $G_v$. The central wavelength of light reflected by the variable grating $G_v$ back to the source 21 is determined by the amount of strain imposed on the variable grating $G_v$, and this reflection results in tuning of the emission of the laser source 21 to this wavelength. It ought to be realized at this juncture that the variable grating $G_v$ reflects only a portion of the light around the central wavelength, the magnitude of this portion depending on the axial length of the grating $G_v$, and that the remainder of the light at and around this central wavelength continues to propagate further longitudinally of the optical fiber core, that is, toward the sensing gratings $G_1$ to $G_n$. Now, by applying varying stresses to the variable grating $G_v$, it is possible to change its central wavelength and hence to vary the wavelength of the light emitted by the source 21 accordingly. In this manner, the wavelength of the laser source 21 is caused to sweep through the range of wavelengths needed for obtaining reflection from each of the sensing gratings $G_1$ to $G_n$ regardless of the extent of its stressing within the acceptable range (such as the aforementioned 10,000 microstrain). It will be appreciated that each of the sensing gratings $G_1$ to $G_n$ will reflect a perceptible amount of light only when its central wavelength, which is indicative of the stress existing in the structure at its particular location, coincides with the wavelength of the light launched into the fiber core by the light source 20 as determined by the variable grating $G_v$.

To avoid undesirable light reflection at the downstream end face of the optical fiber 10, that is the end face that terminates the end portion 12, an absorber 13 is arranged thereat. Moreover, and for the same reason, another absorber 14 is arranged at an unused branch 15 of an optical coupler 16 that is interposed between the variable grating $G_v$ and the sensing grating $G_1$. In order to reduce the effects of multiple reflections between the gratings $G_1$ to $G_n$, the reflectivities of such gratings $G_1$ to $G_n$ are chosen to be relatively small (i.e. on the order of 0.01 for a few hundred sensors). As a result, multiple reflections would require at least three reflections to return a signal to the upstream end portion 11 of the fiber 10 and thus would be reduced significantly (by the square of the reflectivity) relative to the signal levels resulting from only one reflection.

The laser diode 20 is driven by a laser diode pulser 30 in such a manner as to issue a succession of discrete pulses. Simultaneously, the pulser 30 issues a succession of electric synchronization signals to a connecting line that supplies them to a time division demultiplexer 32. The strain applied to the variable grating $G_v$ and thus the central frequency thereof and the emission frequency of the laser diode 20 is controlled by a grating scanner 33 which issues an electrical wavelength signal that is delivered through another connecting line 44 to the time division multiplexer 32. An optical fiber section 17 coupled to the optical fiber 10 at the optical coupler 16 carries the replicas of the original pulses, which are reflected from those of the gratings $G_1$ to $G_n$ that are tuned to or reflective at the wavelength then emitted by the laser diode 21, to a photodetector 35 that converts such replicas into electrical signals that are carried by a further connecting line 36 to the time division demultiplexer 32.

It will be seen that, in operation, only some of the gratings $G_1$ to $G_n$ will be reflective at any particular wavelength or frequency at which the laser diode 21 happens to emit light at that particular moment, and that the pulse replicas reflected by such reflective gratings will arrive at the detector 35 in different time slots that are staggered with respect to one another in time in dependence on the distances of the sensing gratings in question from the upstream end portion 11 of the optical fiber 10. On the other hand, a different collection of the gratings $G_1$ to $G_n$ will be reflective at any other particular wavelength or frequency at which the laser diode 21 happens to emit light at some other particular moment, with the same result but in different time slots relative to the synchronizing signal. Inasmuch as the time division demultiplexer 32 receives not only the synchronizing signal (which provides the point of origin for the determination of the time of arrival of the replicas of the respective laser pulse from the then reflective sensing gratings) but also the signal wavelength signal from the grating scanner 33 (which is indicative of the wavelength or frequency of the light emitted by the laser diode 20), as well as the electrical signals from the photodetector 35 (which are indicative of the arrival of the aforementioned replicas at the photodetector 35), it is able to allocate the respective replicas to the then reflective sensing gratings on the basis of the time of arrival, and determine the stresses existing at the various locations of the structure on the basis of the wavelengths at which the associated individual sensing gratings $G_1$ to $G_n$ situated at such locations of the structure are reflective.

The above arrangement and the technique employed therein lend themselves excellently to efficient evaluation of the encountered structural stresses, especially because it is not necessary to measure the intensity of the pulse replicas or echoes returned from the respective sensing gratings $G_1$ to $G_n$; rather, the time division demultiplexer 32 operates on the basis of simple yes/no (i.e. presence/absence of detectable return optical signal) decisions for each of the time slots at each wavelength, which is a procedure excellently suited for tabulation in binary form and/or display. Thus, the time division demultiplexer 32 can have a very simple construction that need not and will not be discussed here because demultiplexers of this kind are well known and easily available.

The drawing further indicates how electrical signals derived from the demultiplexer 32 can be displayed. To this end, the output signals that are issued by the demultiplexer 32 and that carry information both as to the time slots and the frequency or wavelength are supplied through a connecting line 37 to a monitor 38. As is well known, the monitor 38 includes a screen that is capable of displaying images, in this case maps or graphs, consisting of what can be considered as a multitude of picture elements arranged in respective horizontal rows and vertical columns. Now, assuming that the information indicative of the echoes received at a particular wavelength is supplied by the multiplexer 32 to the monitor 38 in series, beginning at the time of the synchronization pulse, the respective row represents this particular wavelength and the successive columns display information, for instance in the form of vertical excursions from a baseline, as to the time slots of the echoes and thus as to the identity of those of the gratings $G_1$ to $G_n$ that are reflective at this wavelength. This approach is particularly appropriate when the emission frequency of the laser diode 20 is maintained at the same wavelength during each pulse and changes from one pulse to another. On the other hand, when the data serially presented by the multiplexer 32 to the monitor 38, beginning at the time of the synchronization pulse, is indicative of the echoes received in a particular time slot, the respective row represents this particular time slot and thus the identity of a particular one of the gratings $G_1$ to $G_n$, and the successive columns display information, for example again in the form of vertical excursions from a baseline, on the wavelength at which this particular one of the gratings $G_1$ to $G_n$ is reflective. This latter approach is particularly useful when the variable grating $G_v$ causes the laser diode 20 to scan through the band of appropriate wavelengths during each pulse, so that all of the sensing gratings $G_1$ to $G_n$ are addressed at their respective reflecting wavelengths by the same laser diode pulse and thus all issue echoes in response thereto, but at different wavelengths and thus in response to temporally different portions of the pulse. In any event, the screen of the monitor 38 displays a two-dimensional map or grid depicting the association of various stresses with various locations of the structure being examined.

As mentioned before, the arrangement of the present invention is particularly suited for use in detecting structural stresses existing at various locations of a structure; however, it is also contemplated to use the arrangement of the present invention, in a slightly modified form thereof, for measuring other physical quantities, such as temperature, electric field, magnetic field, or the like, instead of structural stresses, at the various locations that either are situated within a structure or are independent of any structures. In this case, the optical fiber 10 is provided, at least at the regions of the sensing gratings $G_1$ to $G_n$, with means for applying longitudinal stresses to such regions in response to and in dependence on the extent of change in the respective physical quantity from its initial magnitude. Such means may include, for instance, coatings applied to the external surface of the optical fiber 10 and changing their dimensions when exposed to varying temperatures, magnetic fields or electric fields, or, for that matter, other arrangements disclosed in the aforementioned commonly owned patent application Ser. No. 07/456,449.

While the present invention has been illustrated and described as embodied in a particular construction of a structural stress sensing and evaluating arrangement, it will be appreciated that the present invention is not limited to this particular example; rather, the scope of protection of the present invention is to be determined solely from the attached claims.

I claim:

1. An arrangement for determining the magnitudes of selected physical quantities at a multitude of spaced locations, comprising
    an elongated optical fiber having a waveguiding core and including a multitude of separate longitudinally spaced Bragg sensing gratings of substantially identical initial periodicity for all of said sensing gratings, each of said sensing gratings being situated at a different one of the locations;
    means for applying to said optical fiber longitudinal stresses the magnitude of which at each of the locations is dependent on the extent of deviation of the magnitude of the respective physical quantity being monitored at that particular location from its initial value, with attendant change in said periodicity;
    means for launching light pulses into said core for propagation longitudinally thereof and for return from any of said sensing gratings of a detectable light echo at a central wavelength determined by instantaneous value of said periodicity of the respective sensing grating when the wavelength of the light reaching said respective sensing grating at least momentarily coincides with said central wavelength thereof;
    means for so controlling the wavelength at which said launching means issues light as to coincide, at different times of a detection cycle, with at least all of said central wavelengths at which said sensing gratings return said echoes within the range of longitudinal stresses expected to be applied to said gratings by said applying means;
    means for conducting said light echoes to a detecting location spaced from said optical fiber;
    means for detecting said light echoes as they arrive at said detecting location and for issuing a series of detection signals in response thereto; and
    means for allocating said detection signals to the respective sensing gratings on the basis of time intervals elapsed between the issuance of the respective light pulses and the arrival of said echoes responsive thereto at said detecting means, and to the respective longitudinal stresses applied by said applying means to said respective sensing gratings on the basis of the respective wavelengths of said light pulses in response to which said respective gratings return said echoes.

2. The arrangement as defined in claim 1, wherein said launching means includes a tunable laser; and wherein said controlling means includes a variable grating of the same type, and of substantially the same initial periodicity, as said sensing gratings and interposed between said laser and said sensing gratings, and means for applying selectively varying longitudinal stresses to said variable grating with attendant changes in said periodicity thereof and thus in the instantaneous central wavelength at which said variable grating returns said echoes to said tunable laser to cause said wavelength issued by the latter to coincide with said instantaneous central wavelength of said variable grating.

3. The arrangement as defined in claim 2, wherein said core of said optical fiber has an input portion that incorporates said variable grating.

4. The arrangement as defined in claim 3, wherein said conducting means includes an auxiliary optical fiber coupled to said optical fiber between said variable grating and said sensing gratings and leading to said detecting means.

5. The arrangement as defined in claim 1, wherein said allocating means includes means for displaying the information contained in said detection signals in respective grid rows and columns that are associated with said sensing gratings and quantities.

6. The arrangement as defined in claim 5, wherein said allocating means includes means for demultiplexing said detection signals on the basis of said time intervals and wavelengths, and means for supplying the demultiplexed detection signals to said displaying means.

7. The arrangement as defined in claim 1, wherein said sensing gratings are embedded in said core.

8. An arrangement for determining stresses in a structure, comprising:
    an elongated optical fiber having a core including a multitude of separate longitudinally spaced embedded sensing gratings constituted by periodic refractive index variations of substantially identical initial periodicity for all of said sensing gratings, said sensing gratings being situated at spaced regions of the structure and so attached to the latter that structural stresses at each of said regions are transmitted to that of said sensing gratings that is situated thereat with attendant change in said periodicity;

means for launching light pulses into said core for propagation longitudinally thereof and for return from any of said sensing gratings of a detectable light echo at a central wavelength determined by instantaneous value of said periodicity of the respective sensing grating when the wavelength of the light reaching said respective sensing grating at least momentarily coincides with said central wavelength thereof;

means for so controlling the wavelength at which said launching means issues light as to coincide, at different times of a detection cycle, with at least all of said central wavelengths at which said sensing gratings return said echoes under all expected structural stresses;

means for conducting said light echoes to a detecting location spaced from said optical fiber;

means for detecting said light echoes as they arrive at said detecting location and for issuing a series of detection signals in response thereto; and means for allocating said detection signals to the respective sensing gratings on the basis of time intervals elapsed between the issuance of the respective light pulses and the arrival of said echoes responsive thereto at said detecting means, and to the respective structural stresses then existing at said regions associated with said respective sensing gratings on the basis of the respective wavelengths of said light pulses in response to which respective gratings return said echoes.

9. The arrangement as defined in claim 8, wherein said launching means includes a tunable laser; and wherein said controlling means includes a variable grating of the same type, and of substantially the same initial periodicity, as said sensing gratings and interposed between said laser and said sensing gratings, and means for applying selectively varying longitudinal stresses to said variable grating with attendant changes in said periodicity thereof and thus in the instantaneous central wavelength at which said variable grating returns said echoes to said tunable laser to cause said wavelength issued by the latter to coincide with said instantaneous central wavelength of said variable grating.

10. The arrangement as defined in claim 9, wherein said core of said optical fiber has an input portion that incorporates said variable grating.

11. The arrangement as defined in claim 10, wherein said conducting means includes an auxiliary optical fiber coupled to said optical fiber between said variable grating and said sensing gratings and leading to said detecting means.

12. The arrangement as defined in claim 8, wherein said allocating means includes means for displaying the information contained in said detection signals in respective grid rows and columns that are associated with said sensing gratings and stresses.

13. The arrangement as defined in claim 12, wherein said allocating means includes means for demultiplexing said detection signals on the basis of said time intervals and wavelengths, and means for supplying the demultiplexed detection signals to said displaying means.

* * * * *